No. 610,405. Patented Sept. 6, 1898.
F. R. LACOSTE.
SEAL.
(Application filed Dec. 24, 1897.)
(No Model.)
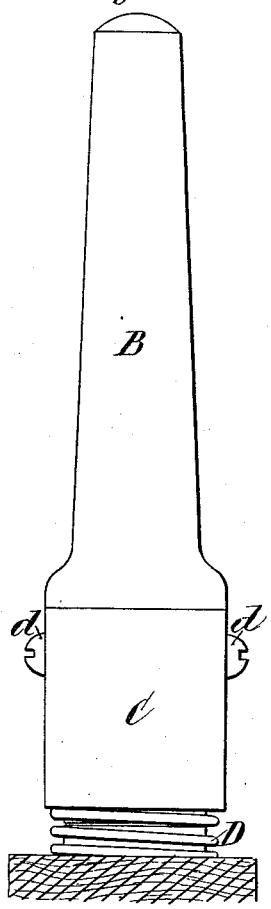
Fig. 3.
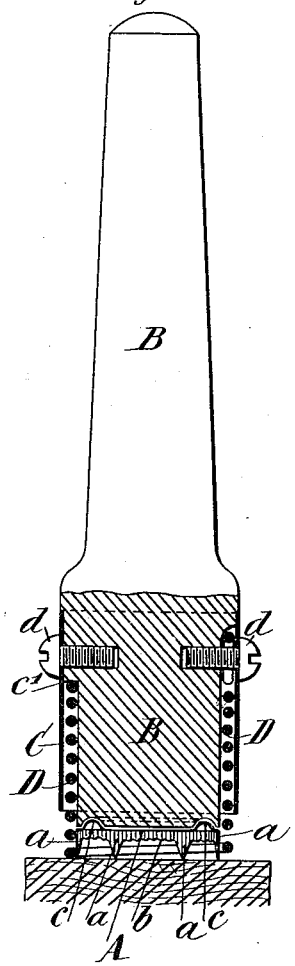
Fig. 4.
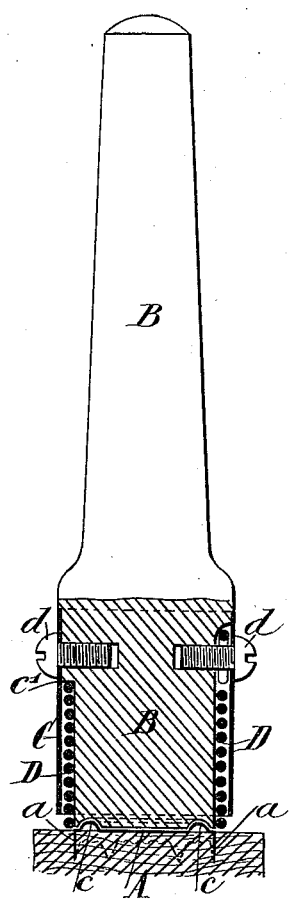
Fig. 5.
Fig. 1.
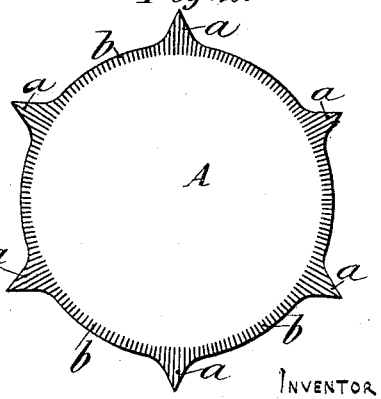
Fig. 2.
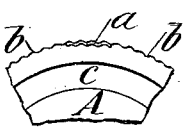
WITNESSES:
F. W. Wright
S. C. Connor
INVENTOR
F. R. Lacoste
BY
Howson and Howson
HIS ATTORNEYS.
THE NORRIS PETERS CO., PHOTO-LITHO., WASHINGTON, D. C.

UNITED STATES PATENT OFFICE.

FRANÇOIS RAOUL LACOSTE, OF BORDEAUX, FRANCE.

SEAL.

SPECIFICATION forming part of Letters Patent No. 610,405, dated September 6, 1898.

Application filed December 24, 1897. Serial No. 663,420. (No model.) Patented in France July 28, 1896, No. 258,297.

*To all whom it may concern:*

Be it known that I, FRANÇOIS RAOUL LACOSTE, a citizen of the Republic of France, residing at Bordeaux, (Gironde,) France, have invented a Seal for Casks, Barrels, and the Like, (for which I have obtained a French patent, dated July 28, 1896, No. 258,297,) of which the following is a specification.

This invention relates to a kind of guarantee or indicating seal for casks, kegs, and barrels of all kinds and to a method of applying the said seals thereto.

These seals insure a perfect inviolability to casks sent even long distances. They allow also the bung-holes or stopped escape-outlets to be sealed or covered with the seal without damaging or branding the casks.

The seals are made entirely of metal and are provided with teeth or waving claws and are easily attached by the help of a special tool or rammer, which I have described, that my invention may be more readily understood. They advantageously replace, as regards rapidity and economy of application, the wax seals usually employed.

In the following description I refer to the annexed drawings, upon which—

Figure 1 is a front view, an outer side view, and a diametrical cross-section of one of the seals, as well as a detail view of one of the undulating clasps thereof. Fig. 2 shows another view of the seal. Fig. 3 is a side elevation of the tool or rammer used to attach and fix these seals, Fig. 4 being a part vertical section thereof. Fig. 5 is a similar section of the tool at the moment of the application and insertion of a seal.

The seal shown on Fig. 1 consists of a disk A, of circular or polygonal form, and the periphery of which is provided with a certain number of triangular teeth *a*, squared off from the surface of said disk and connected together by a small flange *b*. The disk A and its teeth *a* are cut out of thin sheet-iron or other similar material. The stamp, punch, or other tool for cutting out these disks forms them of the shape shown on Fig. 2 and at the same time waves the portions forming the teeth *a* and the flange *b* joining the latter. The same punch or stamping-machine also folds over the teeth *a* and the flange *b* and produces on the disks embossed patterns or reliefs suited to the purpose for which the seal is to be used. For instance, on the disk may be formed a raised or projecting ring *c*, similar to the annular collar of wax seals, and an emblem, signs, letters, or trade-mark situated within the said band *c*.

The special and characteristic feature is contained in the triangular shape of the teeth, in the undulation or waving of these latter, and in the undulations of the flange connecting the said teeth. These undulations are made to give stiffness to the teeth and to prevent their deformation when the seal is being put in position. The undulating teeth thus act as ordinary nails. Similarly the undulating flange prevents outward deformation of the seal at the same time that it strengthens the teeth connected by it.

To place in position the seal formed as above, I use the tool shown on Figs. 3, 4, and 5. This tool is composed of a sleeve B, made of metal or other suitable material, on which is fixed by means of one or more screws *d* a metallic socket C. The sleeve B is furnished with a suitably-shaped shoulder or extension at *c'*, so as to leave a space between its lower part and the socket C, and in this space is situated a spring D, retained in the tool by one of the screws *d*, as shown on the drawings. When at rest, the rammer presents the appearance given in Figs. 3 and 4. In this position the spring D bears upon the lower extremity of the sleeve B and the socket C. When it is desired to use the tool to apply an indicating or guarantee seal, the latter is placed, as shown on Fig. 4, in a recess formed in the lower part of the rammer, which recess is limited or bounded sidewise by the spring D and the bottom of which recess is formed of the sleeve B. The rammer is then applied to the cask so that the lower end of the spring will be in contact with this latter. The head of the sleeve B is then struck, and by reason of the force thus exerted and obtained from this blow on the seal the teeth of this latter, as well as the circular flange thereof, are driven into the head or other portion of the cask, as shown on Fig. 5. As the sleeve B descends the spring D serves as a guide for the teeth a of the plate and this spring is compressed in the space between the said sleeve and the socket C. As soon as or after the blow has been given to the sleeve B the spring D returns to its former position and the rammer is ready for a fresh stroke. This tool can have any proportions suited to those of the seal to be put in position, and the seal's dimensions may be any desired and suitable ones. As regards the plates, they may be covered with a coating or glazing of varnish, japan, or the like of any suitable color, and they may thus present the appearance of the wax seals which they are intended to replace. Under the seals I may place disks or a layer of packing, cloth, or other suitable material. These seals are applied to casks either over the bung-hole, the draw-off, or other openings which have been previously closed and by means of which communication has been or is to be made with the interior of the cask.

The tool above described may be made without the spring described.

I claim—

1. A seal for casks, barrels and the like, having teeth adapted to take hold of the article to which it is to be attached, said teeth being undulated or waving in cross-section, substantially as described.

2. A seal for casks, barrels and the like, with an edge which is forced into the cask, having projections or teeth and a flange connecting and strengthening said teeth, said teeth and flange being of an undulated or waving cross-section, substantially as described.

In testimony whereof I have signed my name to this specification in the presence of two subscribing witnesses.

FRANÇOIS RAOUL LACOSTE.

Witnesses:
D. LOUMEMIRE,
JEAN PAUL AFERO.